C. ROSS.
CONDUIT OR PIPE BENDER.
APPLICATION FILED FEB. 18, 1914.

1,118,056.

Patented Nov. 24, 1914.

Witnesses.
W. C. Stein
B. M. Austine

Inventor
Charles Ross
By Alfred Blair, Atty.

UNITED STATES PATENT OFFICE.

CHARLES ROSS, OF ST. LOUIS, MISSOURI.

CONDUIT OR PIPE BENDER.

1,118,056.  Specification of Letters Patent.  Patented Nov. 24, 1914.

Application filed February 18, 1914. Serial No. 819,336.

*To all whom it may concern:*

Be it known that I, CHARLES ROSS, a citizen of the United States, and resident of St. Louis, Missouri, have invented certain new and useful Improvements in Conduit or Pipe Benders, of which the following is a specification.

This invention relates to improvements in a conduit or pipe bender and has for its object a rigid member, and an adjustable sliding member so arranged as to be adjusted to accommodate various sizes of conduits or pipes and a means whereby both members are firmly held in their adjusted position.

A further object of my invention is to construct a device which is used for the purpose of bending conduits, pipes and rods, the same arranged adjustable to accommodate various sizes and a means for holding the members constituting the device in a rigid adjusted position.

Figure 1:
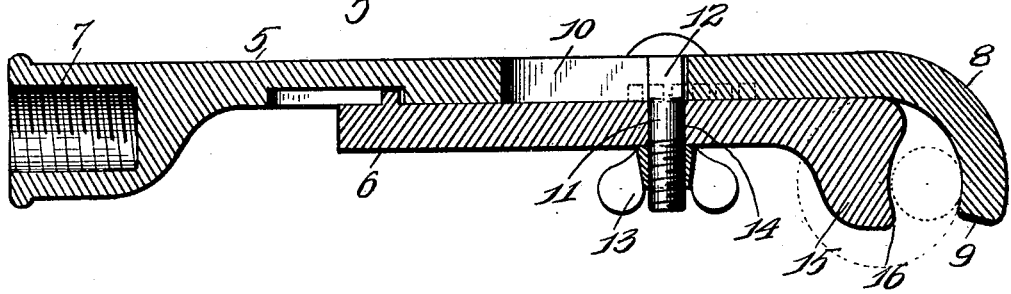
Figure 2:
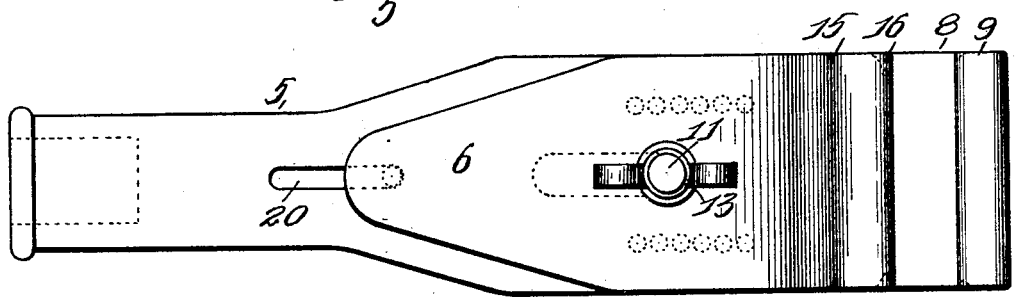
Figure 3:
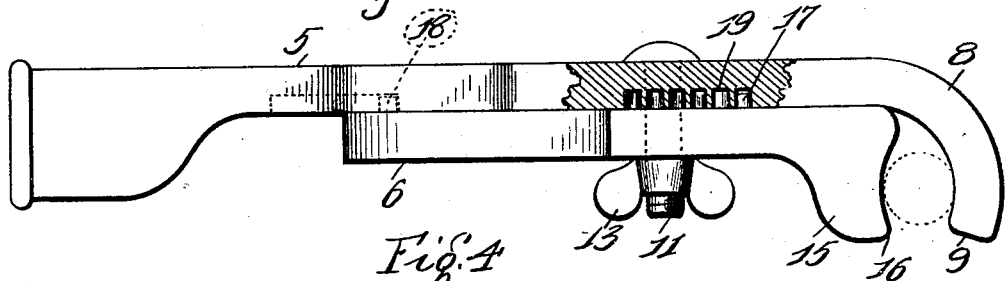
Figure 4:
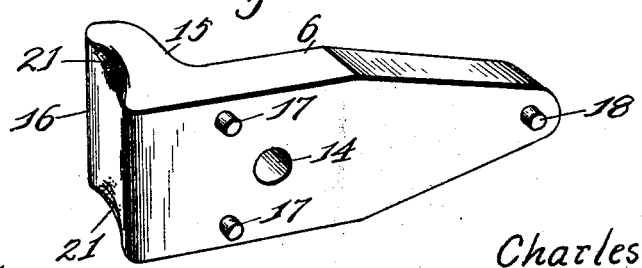

Figure 1 is a horizontal sectional view. Fig. 2 is a plan view of the same. Fig. 3 is an edge view with a part broken away and in section showing the apertures and lug which communicates therewith for supporting the device in adjusted position. Fig. 4 is a detail perspective view of the adjustable sliding member.

In carrying out my invention I provide a pipe or conduit bender composed of a rigid member 5 and an adjustable sliding member 6; the rigid member 5 is provided with a socket 7 in which can be inserted a pipe or bar of any length to form a handle of proper leverage, and the opposite end of said rigid member is suitably bent forming a jaw 8, the inner surface thereof being curved to correspond with the contour of the conduit or pipe, and its end 9 extending a short distance beyond the center of the conduit or pipe, the purpose of which is to provide free access for the admission of the jaw over the pipe after the device has been placed in proper adjusted position. This rigid member is also provided with a central elongated slot 10 through which is inserted a bolt 11 provided with a square shoulder 12 which rests in the slot and prevents the bolt from turning when tightening the thumb nut 13; this bolt is seated in an aperture 14 formed in the adjustable sliding member 6 and is carried thereby, but permitted to slide in the elongated slot 10. The adjustable member 6 is also provided with a jaw 15, its contacting surface being also curved to correspond with the outer contour of the conduit or pipe and its end 16 is so shaped as to permit the pipe or conduit to be inserted when the space between the contacting surface of both jaws is adjusted to the size of the pipe to be inserted between the same.

On the inner surface of the adjustable member are located lugs or projections 17 and 18. The lugs 17 are adapted to be seated in the apertures 19 formed in the inner surface of the rigid member and the projection 18 is seated in the elongated groove or recess 19 formed in the rigid member.

The position of the apertures 19 in the rigid member are so spaced apart as to permit the jaws to open or close approximately a quarter of an inch during each adjustment. The purpose of this is to open the jaws in corresponding size with the conduits or pipes which are constructed in sizes aggregating an increase of a quarter of an inch.

By the construction of the projections being seated in the apertures, sliding movement of the adjustable member is prevented and a twisting movement of the said jaws is also prevented by the lug 18 extending into the elongated groove 20 and the two jaws are held together by means of the bolt 11 and its thumb nut 13.

The upper and lower edges of the contacting surface of the jaws are slightly rounded as indicated by the numeral 21 and this portion is roughened or serrated so as to give a proper bite into the conduit or pipe with which it is brought in contact and prevent slippage.

The essential feature of my invention is to construct a bender which can be properly adjusted to accommodate various sizes of conduits or pipes and yet remain in a rigid position when so set.

Having fully described my invention, what I claim is:

1. An article of the class described comprising a rigid member, a jaw formed on the end thereof, an adjustable sliding member, lugs formed on the adjustable sliding member, which are arranged to be seated in apertures formed on the surface of the rigid member, and a bolt by which the two members are held in rigid connection when adjusted, substantially as specified.

2. A conduit or pipe bender comprising an elongated rigid member provided with an elongated slot, a socket formed on one end for the insertion of a handle, a jaw formed on the opposite end, an adjustable sliding member, a jaw formed on one end thereof, lugs formed on the contacting surface of the adjustable sliding member, and arranged to be seated in apertures and grooves formed in the rigid member to prevent movement to the adjustable sliding member, and a bolt for supporting the members together, substantially as specified.

In testimony whereof, I have signed my name to this specification, in presence of two subscribing witnesses.

CHARLES ROSS.

Witnesses:
 ALFRED A. EICKS,
 WALTER C. STEIN.

Copies of this patent may be obtained for five cents each, by addressing the "Commissioner of Patents, Washington, D. C."